United States Patent [19]

Volgstadt et al.

[11] 4,216,793
[45] Aug. 12, 1980

[54] SHUTOFF VALVE

[75] Inventors: Frank R. Volgstadt, Madison; Albert H. Reschke, Chagrin Falls; David P. Passerell, Geneva; Raymond A. Day, Seven Hills, all of Ohio

[73] Assignee: Perfection Corporation, Madison, Ohio

[21] Appl. No.: 964,811

[22] Filed: Nov. 30, 1978

Related U.S. Application Data

[63] Continuation-in-part of Ser. No. 811,634, Jun. 30, 1977, abandoned.

[51] Int. Cl.² .............................................. F16K 51/00
[52] U.S. Cl. ..................................... 137/318; 251/63; 251/324; 222/83
[58] Field of Search .................... 137/70, 71, 315, 318, 137/320, 321, 322, 323; 251/63, 321, 324, DIG. 1; 222/5, 83; 220/227, 228

[56] References Cited

U.S. PATENT DOCUMENTS

| | | | |
|---|---|---|---|
| 2,024,208 | 12/1935 | Deschner | 222/83 |
| 2,391,582 | 12/1945 | Martin | 222/83 |
| 2,827,913 | 3/1958 | Wagner | 222/83 |
| 2,839,075 | 6/1958 | Mueller | 137/318 |
| 2,951,646 | 9/1960 | Efford et al. | 251/321 |
| 2,964,290 | 12/1960 | Mueller | 137/318 |
| 3,169,665 | 2/1965 | Colley | 222/83 |
| 3,246,801 | 9/1966 | De Boer | 415/174 |
| 3,313,315 | 1/1964 | Rothwell | 137/318 |
| 3,349,792 | 2/1965 | Larkin | 137/318 |
| 3,428,075 | 2/1969 | Wagner | 137/318 |
| 3,460,553 | 8/1969 | Leopold et al. | 137/15 |
| 3,554,217 | 1/1971 | Ehrens et al. | 137/318 |
| 3,590,839 | 7/1971 | Moore | 137/71 |
| 3,593,958 | 7/1971 | Mueller . | |
| 3,692,044 | 9/1972 | Wise | 137/318 |
| 3,827,449 | 8/1974 | Gurizzan et al. | 137/68 R |
| 3,863,667 | 2/1975 | Ward | 137/318 |
| 3,937,245 | 2/1976 | Christie | 137/318 |

FOREIGN PATENT DOCUMENTS 1218111  5/1960  France ........................................ 251/324

Primary Examiner—Martin P. Schwadron
Assistant Examiner—G. L. Walton
Attorney, Agent, or Firm—Fay & Sharpe

[57] ABSTRACT

A shutoff valve particularly suited for use with fluid pipelines such as natural gas mains or the like constructed from plastic which allows the valve to be selectively opened and closed from a remote location. The valve has a valve body which includes a mounting surface for mounting the valve to the pipeline. A first passageway extends through the valve body into communication with the mounting surface and a second passageway communicates with the first passageway intermediate the ends thereof. Fluid passing outwardly of the valve through the second passageway may be conveyed to the area of useful application. A punch arrangement is included in the first passageway which is conveniently used after valve installation to punch a hole in the side wall of the pipeline to provide fluid communication between the pipeline and valve. In one embodiment, a piston assembly is slidably received in the first passageway and selectively movable between a first normal position blocking such flow and a second open position allowing such flow. The piston assembly is moved from the first to the second position by fluid pressure introduced thereagainst from a remote source and is moved from the second back to the first position under the influence of a spring member. In another embodiment, the valve body includes a third passageway communicating with the first and second passageways. A piston assembly received in the third passageway is selectively movable between first open and second closed positions by external means to allow or prevent fluid flow through the valve as may be desired.

12 Claims, 6 Drawing Figures

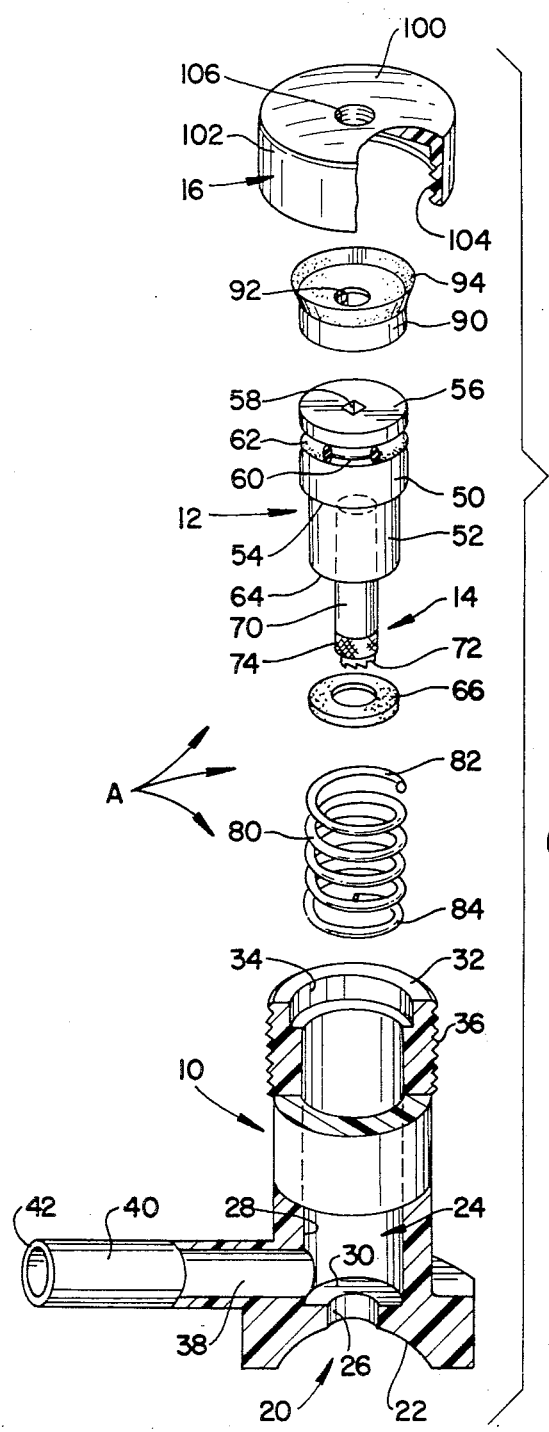
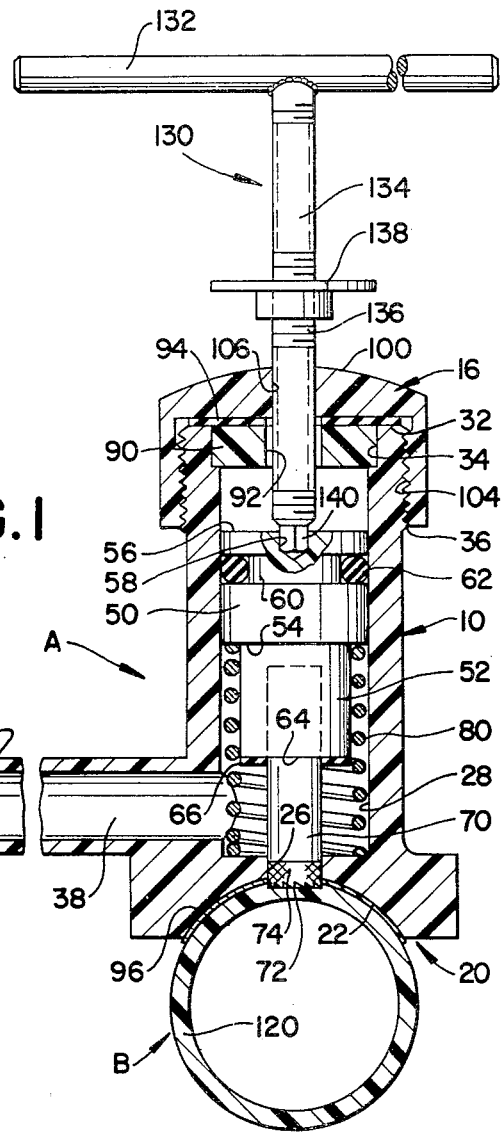
FIG. 1
FIG. 2

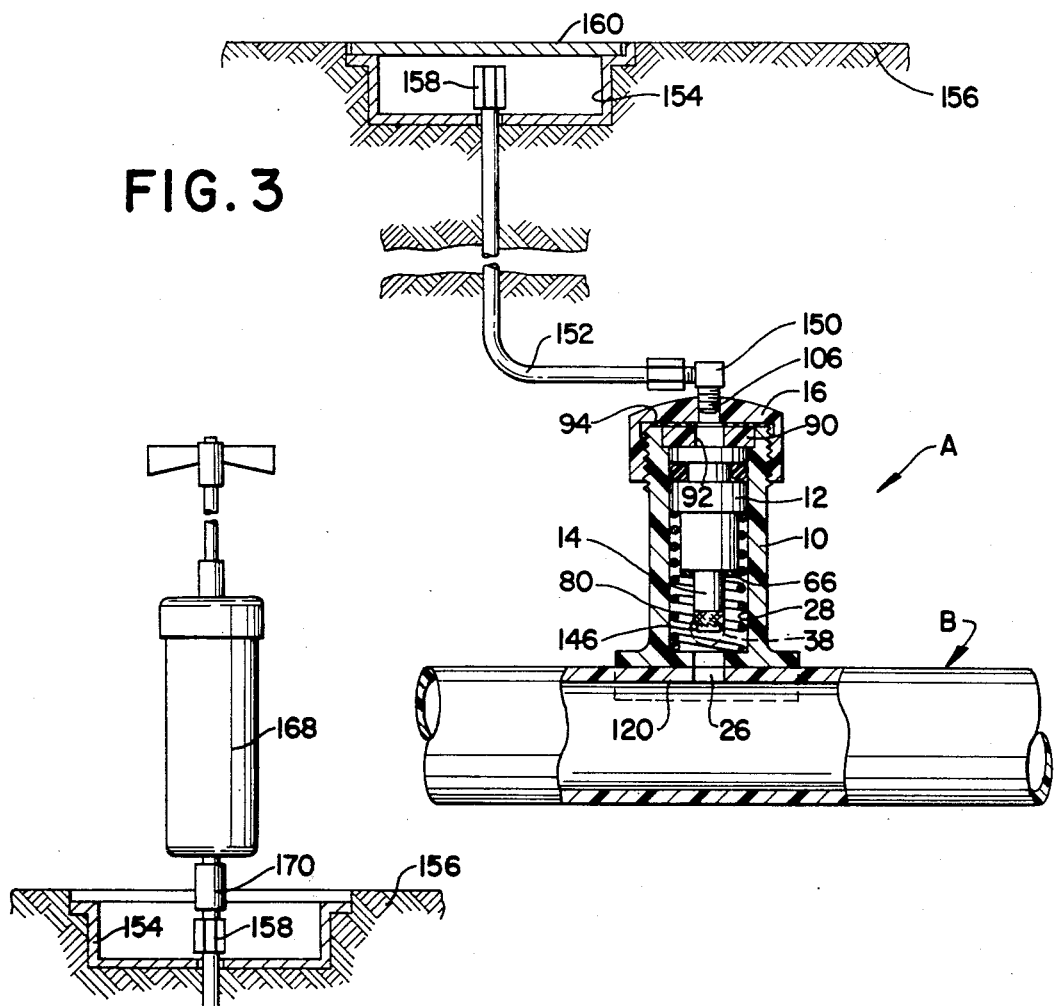

SHUTOFF VALVE

BACKGROUND OF THE INVENTION

This application is a continuation-in-part application of application Ser. No. 811,634, filed June 30, 1977, and now abandoned.

This invention pertains to the art of valves and more particularly to an emergency shutoff valve.

The invention is particularly applicable to an emergency shutoff valve for use with plastic pipelines or mains of the type which supply fluids such as natural gas, water, hydrogen or the like and will be described with particular reference thereto; however, it will be appreciated by those skilled in the art that the inventive concepts have far broader applications and may be utilized in other environments where it is desired to employ a shutoff valve which may be controlled between open and closed positions from a location spaced remote from the valve itself.

Heretofore, most underground fluid supply lines or mains for supplying fluids to homes, commercial establishments and the like have comprised conventional metal pipes buried some distance beneath ground level and typically disposed to run in a continuous manner generally parallel to streets, driveways and the like. These major supply lines or mains act as a manifold for smaller, individual pipelines communicating between the mains and individual houses, commercial buildings or the like which are to receive a natural gas supply. Heretofore, these various pipelines were typically comprised of conventional black pipe and were buried beneath ground level as much as ten to twelve feet. However, and after some period of years, pipeline leaks would begin to occur due to the corrosive action of the natural elements. When such leakage occurred, it usually became necessary to excavate in order to repair the leakage and sometimes just to obtain access to the interconnection between the individual lines and the main or manifold for shutting off gas flow to a particular house, commercial building or the like. Excavation is deemed undesirable in that it is time consuming and adds to the total repair costs. Excavation if also considered undesirable in that it is damaging to the aesthetics of any street, driveway or yard area which is in the path of excavation. Labor and material costs for replacement of these excavated areas are quite high and usually a permanent "scar" is left as a reminder that some type of excavation had been required there.

One of the ever increasing applications of plastic has been toward plastic tubing or pipe for use in many environments. One of the initial uses of such tubing in natural gas supply lines was as a liner for gas supply lines or pipes in order to repair leakage of the type described above caused by the corrosive effect of the elements. Use of plastic liners has, in most instances, decreased the amount of excavation required to repair leaks once they have been detected and isolated. With the success realized in utilizing tubular plastic liners, some attention is now being given to utilizing plastic pipe or tubing for new pipeline or main installations and thereby eliminate all use of conventional black pipe. Because plastic pipe or tubing is relatively unaffected by the elements, its use is deemed to be a viable alternative for eliminating the corrosion problems heretofore encountered.

In using plastic pipe or tubing for underground transmission of natural gas, it is necessary to provide a "T" at the point of interconnection with the main for each gas customer. It has also been considered desirable to provide a shutoff valve or the like at each "T" to facilitate interruption of the gas flow from the main to the individual supply line if and when necessary for maintenance purposes. It is further desirable to provide a "T" which includes a self-tapping or piercing feature for providing fluid communication between the "T" and the main once the "T" has been mounted thereon.

While there have been some prior attempts to provide devices of the general type just described, such prior devices have been employed in somewhat complicated structural designs which themselves could become totally inoperative or lead to operational difficulties once installed and in use over an extended period of time. Moreover, very little design consideration has been given to a "T" which includes a self-tapping or punching feature with the benefits obtained from an emergency shutoff valve which may be operated from a remote location so as to eliminate the necessity for excavation when shutoff is desired.

The present invention contemplates new and improved apparatus which overcomes the above referred to problems and others and provides a new and improved emergency shutoff valve which is simple in design, economical to manufacture, easy to install, includes a self-tapping or punching feature, facilitates valve operation from a remote area and which is readily adaptable to use in many fluid control environments.

BRIEF DESCRIPTION OF THE PRESENT INVENTION

In accordance with the present invention, there is provided a shutoff valve for selectively controlling fluid flow from a fluid supply source. The valve includes a valve body having an area thereon adapted for mounting to a fluid supply source. A first passageway extends through the valve body in communication with the mounting surface and fluid supply sources with a second passageway communicating with the first passageway intermediate the ends thereof. An elongated punch is included in the first passageway and is selectively movable longitudinally thereof to pierce or punch a hole in the side wall of the fluid supply source after valve installation to provide fluid communication between the source and valve. A piston assembly slidably received in the valve body is selectively movable between a first position allowing fluid flow outwardly of the valve through the second passageway and a second position blocking fluid flow through the second passageway. The piston assembly is urged from at least one of the first and second positions toward the other by external force means spaced remote therefrom.

In accordance with another aspect of the present invention, the piston assembly is slidably received in the first passageway extending outwardly from the innermost end face thereof. The first passageway has a first portion adjacent the mounting area interfacing with a second, larger portion which extends to the first passageway outermost end. The innermost piston assembly end face further includes seal means for sealing against the interface area between the first passageway first and second portions when the piston assembly is moved to the second position.

In accordance with a further aspect of the present invention when the piston assembly is received in the first passageway, internal force means disposed in the first passageway continuously acts against the piston assembly to urge it toward the first position. Fluid pressure which is selectively introduced into the first passageway acts against the outermost end face of the piston assembly overcomes the spring biasing force and moves the piston assembly from the first to the second position. Such fluid pressure may be provided to the valve from a position spaced remote therefrom.

In accordance with another aspect of the present invention, the valve body includes a third passageway communicating with both the first and second passageways. The piston assembly is slidably received in this third passageway and is selectively movable between a first position allowing fluid flow outwardly of the valve from the second passageway and a second position blocking such flow.

In accordance with another aspect of the present invention, the piston assembly is moved in the third passageway between the first and second positions by external force means applied to a position spaced remote therefrom.

In accordance with yet a further aspect of the present invention, the punch is adapted to be placed in operable communication with a hand tool for initially forcing it into piercing contact with the fluid supply source for purposes of initiating fluid communication between the valve and source.

The principal object of the present invention is the provision of a new and improved shutoff valve for fluid supply sources.

Another object of the present invention is the provision of a new and improved shutoff valve which includes a self-tapping feature.

Still another object of the present invention is the provision of a new and improved shutoff valve which may be selectively operated from positions spaced remote from the valve itself.

Still another object of the present invention is the provision of a new and improved shutoff valve which is simple in design and easy to manufacture.

Still another object of the present invention is that the valve can be produced from non-corrosive (all plastic) materials so that it does not require cathodic protection.

A still further object of the present invention is the provision of a new and improved shutoff valve which may be readily adapted to use in a number of different fluid control environments.

BRIEF DESCRIPTION OF THE DRAWINGS

The invention may take physical form in certain parts and arrangements of parts, embodiments of which will be described in detail in the specification and illustrated in the accompanying drawings which form a part thereof and wherein:

FIG. 1 is an exploded view, in partial cross-section for ease of illustration, showing one overall valve arrangement contemplated by the subject invention;

FIG. 2 is a cross-sectional view of the valve of FIG. 1 when installed on a fluid pipeline with the piston assembly being moved from the first open position to the second closed position by a hand tool in order to institute fluid communication between the pipeline and valve;

FIG. 3 shows the valve of FIG. 1 installed on a pipeline buried beneath ground level with the valve in the open position and including means for operating the valve from above ground level;

FIG. 4 is a view similar to FIG. 3 showing the valve in a closed position under the influence of the operating means;

DESCRIPTION OF PREFERRED AND ALTERNATIVE EMBODIMENTS

Figure 5:
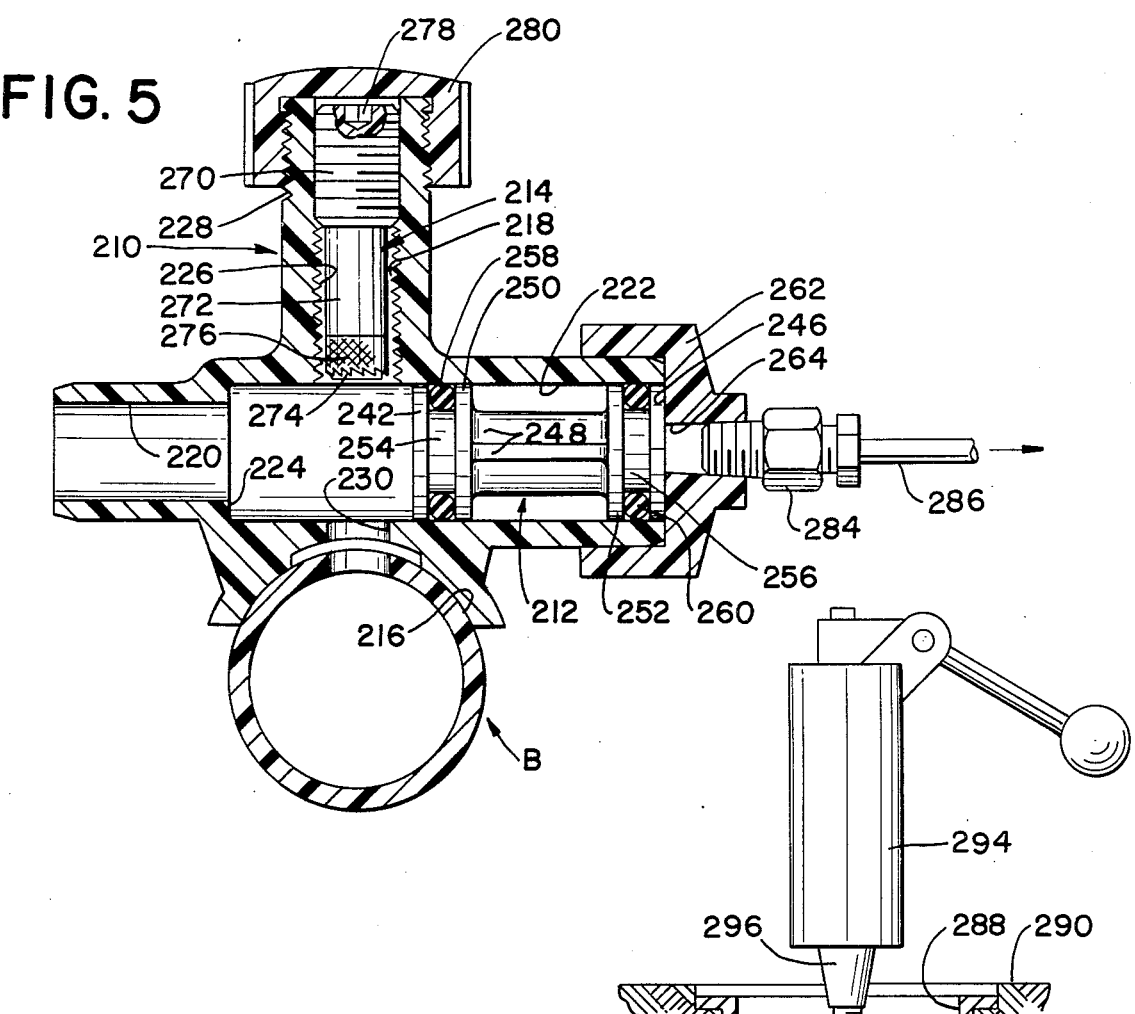
FIG. 5 is a cross-sectional view of an alternative valve construction incorporating the concepts of the subject invention and with the valve installed in a fluid pipeline; and, FIG. 6 shows the valve of FIG. 5 installed on a pipeline buried beneath ground level with the valve in a closed position and including means for operating the valve from above ground level.

Referring now to the drawings wherein the showings are for purposes of illustrating preferred and alternative embodiments of the invention only and not for purposes of limiting same, FIGS. 1–4 show a shutoff valve A affixed to a main or pipeline B. The shutoff valve itself is primarily comprised of a valve body generally designated 10, a piston assembly generally designated 12 which includes a punch generally designated 14 and a bonnet generally designated 16.

More specifically, and with particular reference to FIGS. 1 and 2, valve body 10 includes a saddle type mounting area generally designated 20 which is preferably defined by an elongated arcuate generally semi-circular surface 22. A first cylindrical passageway 24 extends longitudinally through valve body 10 and communicates with surface 22 for reasons which will become more readily apparent hereinafter. This first passageway is defined by a first portion 26 and a second portion 28 which communicate with each other at an interface or shoulder area 30. Second portion 28 extends from the interface or shoulder area to outer end 32. Extending inwardly from outer end 32 is a slightly enlarged recessed area or bore 34, the purpose of which will be described hereinafter. A threaded area 36 is disposed along a portion of the outer side wall of body 10 from outer end 32 to threadedly receive bonnet 16.

A second passageway generally designated 38 communicates with second portion 28 of first passageway 24 adjacent interface or shoulder area 30. This second passageway is adapted to convey fluid from main or pipeline B to a house, business establishment or the like for useful application. The second passageway is defined by a tube-like member generally designated 40 which may be formed as an integral part of body 10 or as a separate component conveniently affixed thereto. Tube-like member 40 has an outer end 42 adapted to be connected to a longer conduit for conveying the fluid to the point of useful application. As to the environment in which the present invention is being described, that is, natural gas supply lines, main or pipeline B may be located adjacent the street so that the conduit affixed to outer end 42 of tube-like member 40 may have to cover quite some distance to the point of use. However, such installations are deemed conventional, do not form a part of the present invention and are not described herein in any greater detail.

In the preferred arrangement here under discussion, valve body 10 is constructed from a plastic material. While polyethylene plastic is preferred, other plastics could also be advantageously employed without in any way departing from the intent or scope of the invention involved. Moreover, and for application to other environments as well as the natural gas supply environment specifically described herein, materials other than plastic such as cast iron, stainless steel, brass, etc. could also be advantageously employed.

Piston assembly 12 is comprised of an upper cylindrical portion 50 and a lower cylindrical portion 52 separated from each other by a shoulder area 54. Upper portion 50 is dimensioned to be closely slidably received in second portion 28 of the first passageway and lower portion 52 has a diameter somewhat less than the upper portion. The upper portion includes a transverse end face 56 which includes a generally centrally located and inwardly extending opening 58. In the preferred embodiment here under discussion, this opening has a generally square configuration for reasons which will be described hereinafter, although other configurations such as an elongated slot could also be advantageously employed.

Extending around upper portion 50 is a circumferential groove 60 which receives an O-ring type seal 62 therein. While upper portion 50 is closely slidably received in second portion 28 of the first passageway, this O-ring type seal provides positive sealing between opposite ends of the piston assembly. Cylindrical lower portion 52 of the piston assembly includes an end face generally designated 64 which is disposed parallel to end face 56. An annular seal member or washer generally designated 66 is affixed by convenient means to end face 64 to effect sealing for the valve when it is placed in the closed position as will be described in greater detail hereinafter. Seal member or washer 66 could take any number of configurations and, for example, a lip seal arrangement could also be advantageously employed. In that instance, the lip seal would be disposed to extend outwardly of end face 64 adjacent the outer peripheral face thereof.

In the preferred arrangement here under discussion, piston assembly 12 is preferably constructed from a plastic material. Polyethylene plastic is preferred although other materials could also be advantageously employed as hereinabove discussed with regard to valve body 10. O-ring type seal 62 and seal member or washer 66 are preferably constructed from a rubber or elastomeric material.

Punch 14 comprises an elongated cylindrical body 70 coaxially mounted relative to the piston assembly and has an outside diameter which allows the body to be closely slidably received through first portion 26 of the first passageway for reasons which will be described in greater detail hereinafter. A portion of the uppermost end of body 70 is received in piston assembly 12 inwardly from end face 64 and rigidly anchored therein by convenient means. Extending axially outward from the outermost end of body 70 is a cutting edge generally designated 72 to facilitate a trepanning type of cutting operation into main or pipeline B as will be described. Cutting edge or area 72 may be comprised of a plurality of outwardly extending cutting teeth as shown in the FIGURES or any number of other configurations which could be advantageously employed to penetrate the main without departing in any way from the scope or intent of the invention. Moreover, the area of body 70 disposed immediately radially inward from cutting edge 72 may be relieved somewhat for retaining that portion of the material or the plug removed from the main or pipeline during the trepanning operation therein. A knurled area 74 is disposed circumferentially around body 70 adjacent the outermost end thereof at cutting edge or area 72 for purposes of reaming the hole placed in main or pipeline B as a result of the trepanning operation.

In the preferred embodiment here under discussion, punch 14 is constructed from stainless steel because of its hardness, corrosion resistance, and other physical characteristics providing for an acceptable punch construction. If desired, cutting edge 72 may be separately manufactured and mounted to body 70 to facilitate use of special materials therefore. Again, cutting edges other than the toothed arrangement shown in the FIGURES may be used to penetrate side wall 120. For example, a drilling or piercing type of action could be used in place of the trepanning action if desired.

A first force means utilized to retain the valve in a first or normal open position comprises a coiled spring 80 having opposed ends 82, 84. The inner and outer diameters of this spring are such that it will be slidably received in second portion 28 of the first passageway over punch 14 and lower portion 52 of the piston assembly with ends 82, 84 engaging shoulder area 54 and interface or shoulder area 30, respectively. Spring 80 comprises an expansion type of spring having a length such that an upward biasing force will be continuously placed on piston assembly 12 at shoulder area 54.

An annular spacer member generally designated 90 is dimensioned to be closely received in recessed area or bore 34 adjacent outer end 32 of the valve body. This spacer essentially acts as a stop for defining the first or normal position of piston assembly 12 and includes a central opening 92 therethrough. A generally frusto-conical, flexible seal 94 is affixed to the upper surface of the spacer as is best shown in FIG. 1. Seal 94 provides sealing between the bonnet and valve body as is shown in FIG. 2.

Bonnet 16 is employed to close outer end 32 of valve body 10. This bonnet has a generally cup-shaped configuration and is comprised of a top wall 100 and a side wall 102 extending outwardly therefrom. This side wall includes a threaded area 104 which cooperates with threaded area 36 on the valve body. Generally centrally disposed in and extending through top wall 100 is a threaded opening generally designated 106.

Both spacer 90 and bonnet 16 are constructed from polyethylene plastic in the preferred arrangement here under discussion, although other materials could be advantageously employed as discussed above with reference to the other valve components. Frusto-conical seal 94 is preferably constructed from rubber and affixed to the upper surface of spacer 90 by convenient means.

With particular reference to FIG. 2, the subject shut-off valve is shown in the assembled condition mounted on pipeline B and with the piston assembly moved by manual means so that cutting edge 72 and knurled area 74 of the punch are placed in a cutting and reaming condition with the side wall 120 of main or pipeline B. Since the specific outside dimensions of the main or pipeline will be known, the valve body is manufactured so that arcuate, generally semi-circular surface 22 of the saddle-type mounting area is closely fitted to the outside surface of the main or pipeline. Since both the main or pipeline and valve body are constructed from similar polyethylenes, a heat fused joint may be effected. Alternative means could also be advantageously employed such as, for example, a mechanical coupling.

One benefit obtained from the subject invention is that the valve may be mounted anywhere along the main or pipeline without first cutting or piercing a hole therein or first shutting down the pipeline. That is, the arrangement of the subject invention allows the necessary hole through side wall 120 to be pierced or cut after the valve has been mounted to the main and prior to the time that the valve is placed into actual operation.

As will be noted from the arrangement of FIG. 2, when the various components hereinabove previously described in detail are assembled, generally frusto-conical seal 94 is moved to a flattened condition and acts as a seal between the inner surface of bonnet top wall 100 and the upper surface of spacer 90 and outermost end 32 of the valve body. The piston assembly is moved upwardly in second portion 28 of the first passageway so that end face 56 engages the lower surface of spacer 90 (as shown in FIG. 3). This then defines the first or normal position for the valve and comprises an open position so that fluid will be able to flow from main or pipeline B into the valve body and outwardly therefrom through second passageway 38. As will also be noted from FIG. 2, threaded opening 106 in the bonnet and central opening 92 in the spacer are aligned with each other and also aligned with inwardly extending square opening 58 in end face 56 of the piston assembly.

With continued reference particularly to FIG. 2 and in order to pierce, punch or cut an appropriate opening in side wall 120 of the main or pipeline, a hand tool generally designated 130 is conveniently provided. This hand tool comprises a handle portion 132 having an elongated shank 134 rigidly affixed thereto with the shank including threaded area 136 over a portion thereof from the outermost end. Threads 136 are adpated to be placed into threaded communication with threaded opening 106 in the bonnet. A stop ring or member 138 is positioned on shank 134 to act as a stop against the upper surface of bonnet top wall 100 when the punch has been moved a sufficient distance so that an opening has been made through the side wall 120 by cutting edge or area 72. Thus, the spacing of stop member 138 from the outermost end of shank 134 is a function of the overall dimensioning of the valve and its components. Extending longitudinally outward from the outermost end of shank 134 is an engaging protrusion 140. This protrusion has a keyed configuration congruent to and adapted to be received in opening 58 of piston assembly end face 56. Again, while square configuration has been shown, other configurations such as elongated slots are equally applicable for use.

Hand tool 130 is threadedly inserted into threaded opening 106 toward engagement with the piston assembly. Protrusion 140 is received in opening 58 and further threaded advancement of shank 134 causes the piston to be driven downwardly through second portion 28 of the first passageway until the outermost end of punch body 70 passes through first portion 26 of the first passageway and into engagement with side wall 120 of main or pipeline B. Still further advancement of hand tool 130 then causes a trepanning type cutting engagement of cutting edge or area 72 with the side wall which is closely followed by a reaming action through knurled area 74 engaging the side walls of the bored area. The end result of the trepanning cutting action is that a plug 146 (FIG. 4) is cut or pierced out of side wall 120. The outermost end of punch body 70 is configured so that this plug will be retained therein and will not fall into the inside of the main or pipeline itself. Following the trepanning cutting action and when stop 138 of hand tool 130 engages top wall 100 of the bonnet, at which point manual closure of the valve is also effected, the hand tool is retracted from threaded engagement with threaded opening 106. Under the urging of spring 80, the piston assembly is simultaneously moved back into its first or initial opened position. As is best seen from FIG. 3, an opening is thereby provided in side wall 120 of main or pipeline B which is aligned with first portion 26 of the first passageway so that there is fluid communication between the pipeline and the shutoff valve.

Referring particularly now to FIGS. 3 and 4, description will hereinafter be made to use of the subject shutoff valve once it has been installed on a main or pipeline in the manner just described. Normally, the pipeline is located some distance beneath ground level. In order that the valve may be selectively opened and closed by means disposed remote therefrom, preferably from ground level, a tube fitting generally designated 150 is threadedly mounted in bonnet top wall threaded opening 106. A flexible conduit or tubing 152 has one end affixed to this fitting and extends upwardly therefrom to a well-like or plate area generally designated 154 disposed immediately adjacent ground level which itself is generally designated 156. This well-like or plate area is so designed that it is visible or, if buried, can be located using standard pipeline locating devices. A tube fitting generally designated 158 is received on the other end of flexible conduit or tubing 152 and disposed within well-like area 154. Preferably and for reasons which will be more readily appreciated hereinafter, fitting 158 also includes a check valve so as to be able to selectively retain fluid in the conduit and valve. A cover 160 is advantageously received over the well-like area generally flush with ground level 156 to protect fitting 158 from damage. This cover may, if desired, include a locking arrangement to prevent vandalism or unauthorized access.

In the valve position shown in FIG. 3, piston assembly 12 is in its first or normal opened position with the upper end of the piston assembly engaging the lower surface of spacer 90. In this condition, fluid, namely, natural gas, is free to flow from inside main or pipeline B into second portion 28 of the first passageway through first portion 26. From there, the gas is free to flow outwardly of the valve through second passageway 38 for conveyance to a house, commercial establishment or the like for utilization.

In the event it becomes necessary or desirable to discontinue or block fluid flow from the main or pipeline through the valve, the arrangement shown in FIG. 4 is utilized. There, and following removal of cover 160 from association with well 154, a fluid pump 168 having an end fitting 170 is releasably affixed to fitting 158. In the preferred embodiment here under discussion, fluid pump 168 is adapted to pump hydraulic fluid therefrom, through flexible conduit or tubing 152 and into the valve body through fitting 150 at the top wall of bonnet 16. The effect obtained from the fluid pressure thus introduced into the valve is to force piston assembly 12 downwardly against the biasing pressure of spring 80 so as to compress the spring and drive punch 14 through first portion 26 of first passageway, through the opening in side wall 120 of the main or pipeline and into the interior of the pipeline itself. Sufficient fluid pressure is introduced into the valve by means of pump 168 to drive piston assembly 12 downwardly until seal member 66 sealingly engages interface or shoulder area 30 defined between first and second portions 26,28 of the first passageway. A safety by-pass (not shown) could be incorporated within the pump mechanism to assuare that over pressurization of the valve did not occur. O-ring type seal 62 prevents fluid or gas from by-passing of the piston.

Since punch 14 is closely and fully received through first passageway portion 26 and main or pipeline side wall 120 and with the additional sealing obtained between seal member 66 and interface or shoulder area 30, fluid flow is effectively blocked from the pipeline into the valve. Since fitting 158 preferably includes a check valve, fluid pump 168 may be removed from association with that fitting thereby leaving fluid under pressure inside flexible conduit or tubing 152 and the shutoff valve itself to retain the valve in the second or closed position. Of course, when it is desired to again open the valve, it is simply necessary to open the check valve to release the fluid pressure and allow the fluid to drain from the valve upwardly through flexible conduit or tubing 152 under the urging of spring 80. It would be possible to recapture this fluid as it is so drained for subsequent use. As the assembly is moved back to the first position at the urging of spring 80, fluid flow is reestablished between the pipeline and valve. Since this embodiment requires positive system pressure to maintain the valve in its closed position against the action of spring 80, the valve thus disclosed in contemplated for emergency or short term shutoffs.

While control of the valve has been described with reference to a fluid pump supplying hydraulic fluid, other arrangements could also be advantageously employed without in any way departing from the overall intent or scope of the present invention. For example, air or some other gas could also be adapted for use to control the valve under some circumstances. Moreover, and while fluid pump 168 has been generally shown as a hand pump, it would also be possible to incorporate mechanized pumps if so desired.

In a modified embodiment of the invention, the spring 80 could be eliminated and provision could be made to pressurize and depressurize the valve in order to move the piston from one position to another. That is to say means could be employed to evacuate the tubing 152 in order to create a vacuum in the valve body permitting gas pressure to force the piston upwardly.

In a still further modification, a dual pressurizing system could be employed with a valve switching means whereby fluid pressure could be used to force the piston to either an open or closed position.

In yet a further modification, the piston could be actuated utilizing the velocity of fluid moving through the valve or fluid pressure drop in the valve.

Figure 6:
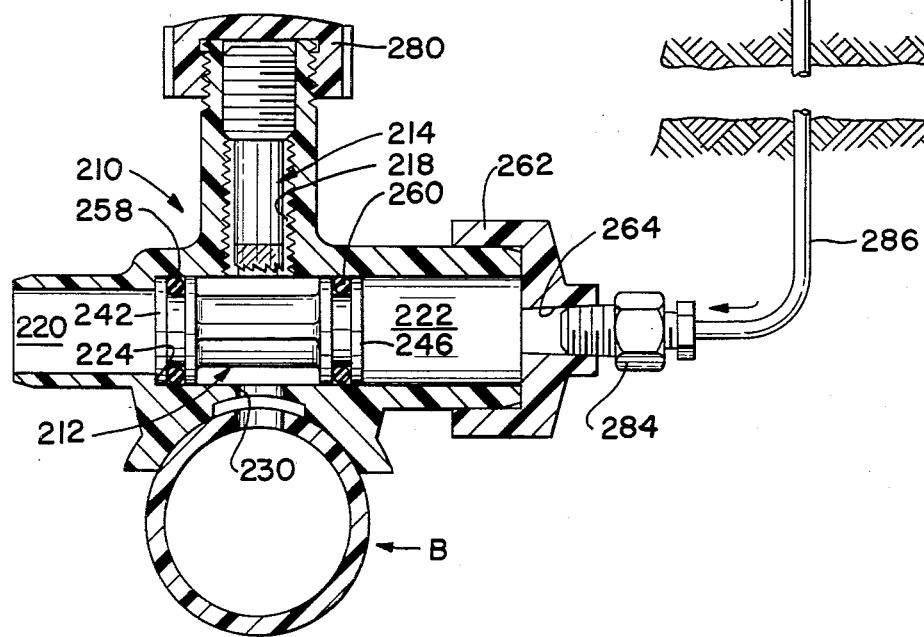

A modified valve construction which incorporates the subject inventive concepts and practices certain of the above noted modifications is shown in FIGS. 5 and 6. While new numerals have been given to all the structural components therein shown, substantial portions of the modified valve construction and its operation are virtually identical to that valve described hereinabove with reference to FIGS. 1–4. Accordingly, a somewhat less detailed description is deemed necessary for an understanding of the valve of FIGS. 5 and 6.

In FIG. 5, the shutoff valve is shown as being comprised of a valve body 210, a piston assembly 212 and a punch or penetration member 214. The valve body includes a saddle type mounting area 216 which is preferably defined by an elongated arcuate generally semi-circular surface for purposes of mounting the valve to a main or pipeline B as previously described. A first cylindrical passageway 218 extends longitudinally through valve body 210 and communicates with the surface of saddle type mounting area 216. Second and third cylindrical passageways 220, 222 communicate with first passageway 218 and with each other. As shown, third passageway 222 extends generally laterally through the first passageway and is generally coaxial with second passageway 220. The third passageway has a diameter greater than the second passageway and the two merge together at a merger area 224 which defines a generally radial shoulder.

First passageway 218 is threaded therealong as at 226 and the valve body includes external threads 228 adjacent the outermost end of the first passageway. The first passageway also includes a portion thereof generally designated 230 extending through saddle type mounting area 216 on the opposite side of third passageway 222 from the first passgeway main portion. Portion 230 is generally circular and of a somewhat smaller diameter than the first passageway main portion.

Piston assembly 212 is comprised of a piston assembly body having opposed end faces 242, 246. A plurality of longitudinally extending ribs 248 are spaced around the body to extend between end areas 250, 252 which themselves are spaced inwardly adjacent end faces 242, 246, respectively. Circumferential grooves 254, 256 are disposed between end faces 242, 246 and end areas 250, 252 to receive O-ring seals 258, 260. The piston assembly body is dimensioned to be slidably received in third passageway 222 with seals 258, 260 engaging the passageway sidewall in a sealing relationship therewith. An end cap 262 is conveniently provided to selectively cover the outermost end of third passageway 222. This cap includes a threaded opening 264 therethrough for reasons which will become more readily apparent hereinafter.

Punch or penetration member 214 includes a threaded body portion 270 adapted to threadedly engage threads 226 along first passageway 218. A shaft-like portion 272 extends outwardly of body portion 270 and further into the first passageway. Disposed at the outermost end of the shaft-like portion is a cutting edge generally designated 274 having a knurled side wall area generally designated 276. Elements 274, 276 are substantially identical to those described hereinabove so that further description thereof is deemed unnecessary. The end of body portion 270 spaced toward the open end area of the first passageway conveniently includes a receiving socket 278 to facilitate selective threaded advancement and retraction of penetration member 214 in the first passageway as will be described hereinafter. Also, an end cap 280 is provided which may be threadedly received on external threads 228 for covering the open end of first passageway 218.

As shown in FIG. 5, the valve is in its opened position with the piston assembly in its first position spaced adjacent the open end area of third passageway 222. In this embodiment, and once the valve has been installed on a main or pipeline, end cap 280 may be threadedly removed from its covering relationship with the first passageway so as to provide access to socket 278 on penetration member body portion 270. A convenient hand tool or the like such as was previously described hereinabove may then be utilized to threadedly advance the penetration member toward engagement with the side wall of main or pipeline B. Threaded advancement is continued until cutting edge 274 passes through passageway portion 230, cuts an opening through the pipeline side wall and knurled area 276 reams the opening.

This operation is as previously described with reference to FIGS. 1-4. Thereafter, penetration member 214 is threadedly retracted in the first passageway to the position shown in FIG. 5 where it will not interfere with movement of the piston assembly between its first and second positions. End cap 280 may then be replaced on the valve body to cover the outermost end of the first passageway. In the position shown in FIG. 5, and with the side wall of main or pipeline B pierced or punched, fluid from inside the pipeline is free to pass into the valve and then outwardly from second passageway 220 in much the same manner previously described.

FIG. 6 shows the valve of FIG. 5 in its installed position with the main or pipeline itself located some distance beneath ground level. To facilitate opening and closing the valve by remote means, a tube fitting generally designated 284 is threadedly mounted in end cap 262 which covers the end of the third passageway. A flexible conduit 286 has one end affixed to this fitting and extends upwardly therefrom to a well-like area or curb box generally designated 288 disposed immediately adjacent ground level which itself is generally designated by numeral 290. As previously noted, the curb box is designed so that it is visible or, if buried, can be located by using standard pipeline locating devices. A tube fitting generally designated 292 is received on the other end of flexible conduit or tubing 286 and disposed within the curb box. It may also be desired to include a check valve in fitting 292 so as to be able to selectively retain fluid in the conduit and valve. Moreover, a cover (not shown) is advantageously provided to cover the curb box and to protect fitting 292 from damage.

Fluid pressure may then be introduced into the valve by means of a pump type arrangement generally designated 294 having an end fitting 296 adapted to be affixed to the system at fitting 292 in order that the valve may be moved between opened and closed positions. In the arrangement here under discussion, pump type arrangement 294 is particularly adapted to pump air or some other gas therefrom through flexible conduit or tubing 286, through end cap 262 and into valve body third passageway 222 to act against piston assembly end face 246. The result of fluid pressure thus introduced is to force piston assembly 212 from the first or valve opened position shown in FIG. 5 to the second or valve closed position shown in FIG. 6.

In the position of FIG. 6, piston assembly end face 242 is in an abutting relationship with shoulder 224 so as to block or prevent fluid flow from the pipeline through second passageway 220. In addition, spaced apart O-ring seals 258,260 are located on either side of first passageway 218 to assist in preventing fluid from the pipeline from flowing through either the second or third passsageways. Moreover, and because of the balanced positioning, fluid pressure from the pipeline acting along the side of the piston assembly will not cause it to shift from the second position shown back toward the first position.

In this embodiment, once the piston assembly is moved to either its first or second position, it will remain in that position until acted upon by some outside force. Thus, and in the view of FIG. 6, once sufficient air or gas pressure has been applied to the piston assembly by means of fluid pump 294 to move it to the second position, the pump may simply be removed from its association with fitting 292. Loss of gas or air pressure in conduit or tubing 286 will have no affect toward moving the piston assembly from the second position back toward its first position. This feature is particularly advantageous for situations where the valve is to be used for what is commonly referred to as long term shutoffs. In such circumstances, it is desirable to eliminate the necessity for continuously maintaining fluid pressure on the piston assembly since loss of such pressure could cause the valve to be reopened. The positive piston assembly operation of the FIGS. 5 and 6 embodiment should be contrasted with the type of operation contemplated in the FIGS. 1-4 embodiment where loss of fluid pressure in the conduit would allow a spring biasing means to urge the piston assembly back to its first or valve opened position.

When it is desired to move the piston assembly from the second position shown in FIG. 6 back to the first position shown in FIG. 5, it is simply necessary to reconnect pump 294 to fitting 292 and, instead of pumping air or gas pressure into the system, create a vacuum or pump a negative pressure which, in turn, slidably draws the piston assembly back to its first position. The pump may then be disconnected from fitting 292 and the valve will remain opened until again acted upon by external force means as just described.

As an alternative valve opening and closing means, a threaded opening (not shown) may extend into piston assembly 212 from end face 246. By simply removing end cap 262 and threadedly inserting an elongated bolt into this piston assembly opening, it is possible to manually effect valve opening and closing. While such provisions are not particularly advantageous once the valve has actually been installed in the ground, some building codes nevertheless require that such a manual actuating feature be included.

In addition to the specific alternative valve construction disclosed with reference to FIGS. 5 and 6, it will be readily apparent to those skilled in the art that many of the structural and operational modifications discussed with reference to the embodiment of FIGS. 1-4 could also be incorporated thereinto. Because of the close similarity in construction and operation of the two valve embodiments, it is not deemed necessary to reiterate these other possible modifications.

Again, and while the subject invention has been described with reference to construction from particular materials and for application in a particular flow control environment, it is possible to vary these materials and to apply the invention to other fluid control environments without in any way departing from the overall intent or scope of the inventive concepts involved.

The invention has been described with reference to two different embodiments. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. A valve for tapping flow from a fluid supply conduit and for controlling the tapped flow without blocking continued flow through the conduit comprising:

a valve body having a mounting area thereon for attachment to a supply conduit;

a first passageway extending through said valve body from an outer end thereof to said mounting area for receiving a penetration member to penetrate the supply conduit and tap fluid therefrom into said first passageway without blocking continued fluid flow through the supply conduit;

a second passageway communicating with said first passageway between said mounting area and said outer end of said valve body;

a smooth unthreaded piston receiving passage in said valve body;

a piston positioned in said piston receiving passage in sliding sealing engagement therewith and being movable between an open position providing fluid flow from said supply conduit to said second passageway and a closed position blocking fluid flow to said second passageway;

said piston having one piston end exposed to the pressure in the supply conduit at least in said open position thereof and having an opposite piston end;

connecting means on said valve body for connecting said piston receiving passage with a remote pressure source for selectively providing a positive pressure to said piston receiving passage at said opposite piston end for moving said piston from said open position to said closed position; and said piston being movable from said closed position to said open position when the pressure acting on said opposite piston end is reduced below a predetermined value.

2. The valve as defined in claim 1 wherein said piston receiving passage is coincidental with said first passageway, said piston having a substantially flat end face facing toward said mounting area, a penetration member extending centrally from said end face, a seal member on said end face outwardly of said penetration member, and a valve body shoulder in said first passageway for engagement by said seal member in said closed position of said piston.

3. The valve as defined in claim 2 including a piston shoulder outwardly of said end face and spaced from said end face in a direction away from said mounting area, and a spring interposed between said piston shoulder and valve body shoulder for normally biasing said piston to said open position.

4. The valve as defined in claim 1 wherein said piston receiving passage is coincidental with said first passageway and said opposite piston end which is acted upon by positive pressure for moving said piston to said closed position includes a rotatable tool drive connection for receiving a tool to rotate said piston, and a penetration member extending centrally from said one piston end for penetrating a supply conduit when said piston is rotated and advanced in a direction toward said mounting area.

5. The valve as defined in claim 1 wherein said piston receiving passage is coincidental with said second passageway and said piston in said closed position thereof extends completely across said first passageway and has seals engaging said second passageway on both sides of said first passageway.

6. The valve as defined in claim 5 wherein said piston is movable from said closed position to said open position when a vacuum is drawn in said piston receiving passage at said opposite piston end.

7. The valve as defined in claim 5 including a penetration member positioned in said first passageway for movement across said second passageway and outwardly of said mounting area for penetrating a supply conduit and being movable to a storage position removed from said second passageway on the opposite side thereof from said mounting area.

8. The valve as defined in claim 1 wherein said piston is stable in both of said open and closed positions thereof and is movable from said open position to said closed position only upon application of a positive pressure in said piston receiving passage at said opposite piston end and is movable from said closed position to said open position only upon development of a vacuum in said piston receiving passage at said opposite piston end.

9. The valve as defined in claim 1 wherein said opposite piston end has a tool connection thereon and said connecting means provides access through said valve body to said tool connection for connecting a tool to said piston for manually moving same between said open and closed positions.

10. A valve for tapping flow from a fluid supply conduit and for controlling the tapped flow without blocking continued flow through the conduit comprising:

a valve body having a mounting area thereon for attachment to a fluid supply conduit;

a first passageway extending through said valve body from an outer end thereof to said mounting area for receiving a penetration member projectable outwardly of said mounting area for tapping a fluid supply conduit;

a second passageway extending transversely of said first passageway on both sides thereof and being located between said mounting area and said outer end of said valve body, said second passageway having a piston storage portion on one side of said first passageway and an open second portion on the opposite side of said first passageway;

a piston slidably received in said second passageway in sealing engagement therewith and movable between an open position providing flow from said first passageway to said second portion of said second passageway and a closed position blocking flow from said first passageway to said second portion of said second passageway;

said piston having one piston end facing said first passageway in said open position thereof and having an opposite piston end;

circumferential seals carried by said piston adjacent said ends thereof;

said piston in said open position thereof being located in said storage portion of said second passageway and in said second position thereof being located across said first passageway with said seals located on opposite sides of said first passageway; and connecting means for connecting said piston storage portion of said second passageway with a remote pressure source for selectively providing a positive pressure thereto at said opposite piston end for moving said piston from said open position to said closed position and for evacuating said second portion of said second passageway at said opposite piston end for moving said piston from said closed position to said open position.

11. The valve as defined in claim 10 including a tool connection at said opposite piston end, said connecting means providing access through said valve body to said tool connection for connecting a tool therewith and manually moving said piston between said open and closed positions.

12. The valve as defined in claim 10 including a penetration member received in said first passageway and threadable therealong between a penetration position projecting outwardly of said mounting area and a storage position retracted on the other side of said second passageway from said mounting area.

* * * * *